US010597573B2

(12) United States Patent
Rutsch et al.

(10) Patent No.: US 10,597,573 B2
(45) Date of Patent: *Mar. 24, 2020

(54) APPARATUS FOR CONCENTRATING WASTEWATER AND FOR CREATING BRINES

(71) Applicant: HEARTLAND TECHNOLOGY PARTNERS LLC, St. Louis, MO (US)

(72) Inventors: Michael J. Rutsch, Pittsburgh, PA (US); Bernard F. Duesel, Jr., Goshen, NY (US); Craig Clerkin, Stoughton, WI (US)

(73) Assignee: HEARTLAND TECHNOLOGY PARTNERS LLC, St. Louis, MO (US)

( * ) Notice: Subject to any disclaimer, the term of this patent is extended or adjusted under 35 U.S.C. 154(b) by 23 days.

This patent is subject to a terminal disclaimer.

(21) Appl. No.: 15/772,694

(22) PCT Filed: Oct. 28, 2016

(86) PCT No.: PCT/US2016/059426
§ 371 (c)(1),
(2) Date: May 1, 2018

(87) PCT Pub. No.: WO2017/079058
PCT Pub. Date: May 11, 2017

(65) Prior Publication Data
US 2018/0312738 A1  Nov. 1, 2018

Related U.S. Application Data

(60) Provisional application No. 62/249,519, filed on Nov. 2, 2015.

(51) Int. Cl.
*B01D 1/14* (2006.01)
*C09K 8/04* (2006.01)
(Continued)

(52) U.S. Cl.
CPC .............. *C09K 8/04* (2013.01); *B01D 1/14* (2013.01); *B01D 1/305* (2013.01); *B01D 21/00* (2013.01);
(Continued)

(58) Field of Classification Search
USPC ............ 159/29, 46, 47.3, 16.2, 44; 210/767; 261/77, 123, 124
See application file for complete search history.

(56) References Cited

U.S. PATENT DOCUMENTS 5,484,471 A * 1/1996 Schwab ................ B01D 47/10
95/8
5,512,085 A * 4/1996 Schwab ................ B01D 47/10
95/200
(Continued)

OTHER PUBLICATIONS

Search Report for International application No. PCT/US2016/059426, dated Feb. 2, 2017.
(Continued)

*Primary Examiner* — Nina Bhat
(74) *Attorney, Agent, or Firm* — Marshall, Gerstein & Borun LLP

(57) ABSTRACT

A liquid concentrator system includes a concentrator or section having a gas inlet, a gas outlet and a mixing corridor disposed between the gas inlet and gas outlet. A liquid inlet is disposed in the mixing corridor between the gas inlet and a narrowed portion. A demister is disposed downstream of the concentrator section. The demister includes a liquid collector to removed liquid from gas flowing through the demister, and a reservoir that collects the removed liquid. A recirculating circuit is disposed between the reservoir and the mixing corridor to transport liquid within the reservoir to the mixing corridor and secondary re-circulating circuit includes a settling tank to separated saturated liquid and suspended solids. A custom brine mixing device is operatively coupled to the settling tank.

13 Claims, 4 Drawing Sheets

(51) Int. Cl.
  *B01D 1/30* (2006.01)
  *C02F 1/04* (2006.01)
  *C02F 1/10* (2006.01)
  *B01D 21/00* (2006.01)
  *C02F 103/00* (2006.01)
  *C02F 103/06* (2006.01)
  *C02F 103/10* (2006.01)
  *C02F 103/18* (2006.01)
  *C02F 103/36* (2006.01)

(52) U.S. Cl.
  CPC .............. *C02F 1/048* (2013.01); *C02F 1/10* (2013.01); *C02F 2103/001* (2013.01); *C02F 2103/06* (2013.01); *C02F 2103/10* (2013.01); *C02F 2103/18* (2013.01); *C02F 2103/365* (2013.01)

(56) References Cited

U.S. PATENT DOCUMENTS

| | | | | |
|---|---|---|---|---|
| 6,383,260 | B1* | 5/2002 | Schwab | B01D 47/10 261/DIG. 54 |
| 7,416,172 | B2* | 8/2008 | Duesel, Jr. | B01D 1/14 261/123 |
| 7,424,999 | B2* | 9/2008 | Xu | B01D 1/305 261/110 |
| 8,066,844 | B2* | 11/2011 | Duesel, Jr. | B01D 1/14 159/16.2 |
| 8,568,557 | B2* | 10/2013 | Duesel, Jr. | B01D 1/14 159/16.2 |
| 2004/0040671 | A1* | 3/2004 | Duesel, Jr. | B01D 1/0058 159/47.1 |
| 2004/0045681 | A1* | 3/2004 | Bolton | B01D 1/30 159/16.2 |
| 2005/0279500 | A1* | 12/2005 | Heins | C02F 1/04 166/266 |
| 2008/0173176 | A1* | 7/2008 | Duesel | B01D 53/18 95/226 |
| 2011/0100924 | A1 | 5/2011 | Duesel, Jr. et al. | |
| 2015/0122498 | A1 | 5/2015 | Duesel, Jr. et al. | |

OTHER PUBLICATIONS

Written Opinion for International application No. PCT/US2016/059426, dated Feb. 2, 2017.

International Preliminary Report on Patentability for International application No. PCT/US2016/059426, dated May 8, 2018.

* cited by examiner

APPARATUS FOR CONCENTRATING WASTEWATER AND FOR CREATING BRINES

FIELD OF THE DISCLOSURE

This application relates generally to liquid concentrators, and more specifically to cost-effective wastewater concentrators that can be easily connected to and use sources of waste heat, whether in a smaller scale, compact, and/or portable setting, in a larger scale, fixed installation, or otherwise. The concentrators can be used to concentrate liquid wastewater streams and to mix custom brines with targeted weights that may be used in the drilling industry as drilling muds.

BACKGROUND

Concentration of volatile or other substances can be an effective form of treatment or pretreatment for a broad variety of wastewater streams and may be carried out within various types of commercial processing systems. At high levels of concentration, many wastewater streams may be reduced to residual material in the form of slurries containing high levels of dissolved and suspended solids. Such concentrated residual may be readily solidified by conventional techniques for disposal within landfills or, as applicable, delivered to downstream processes for further treatment prior to final disposal. Concentrating wastewater can greatly reduce freight costs and required storage capacity and may be beneficial in downstream processes where materials are recovered from the wastewater.

An important measure of the effectiveness of a wastewater concentration process is the volume of residual produced in proportion to the volume of wastewater entering the process. In particular, low ratios of residual volume to feed volume (high levels of concentration) are the most desirable. Where the wastewater contains dissolved and/or suspended non-volatile matter, the volume reduction that may be achieved in a particular concentration process that relies on evaporation of volatiles is, to a great extent, limited by the method chosen to transfer heat to the process fluid.

Conventional processes that affect concentration by evaporation of water and other volatile substances may be classified as direct or indirect heat transfer systems depending upon the method employed to transfer heat to the liquid undergoing concentration (the process fluid). Indirect heat transfer devices generally include jacketed vessels that contain the process fluid, or tubular, plate, bayonet, or coil type heat exchangers that are immersed within the process fluid. Mediums such as steam or hot oil are passed through the jackets or heat exchangers in order to transfer the heat required for evaporation. Direct heat transfer devices implement processes where the heating medium is brought into direct contact with the process fluid, which occurs in, for example, submerged combustion gas systems.

DETAILED DESCRIPTION

Figure 1:
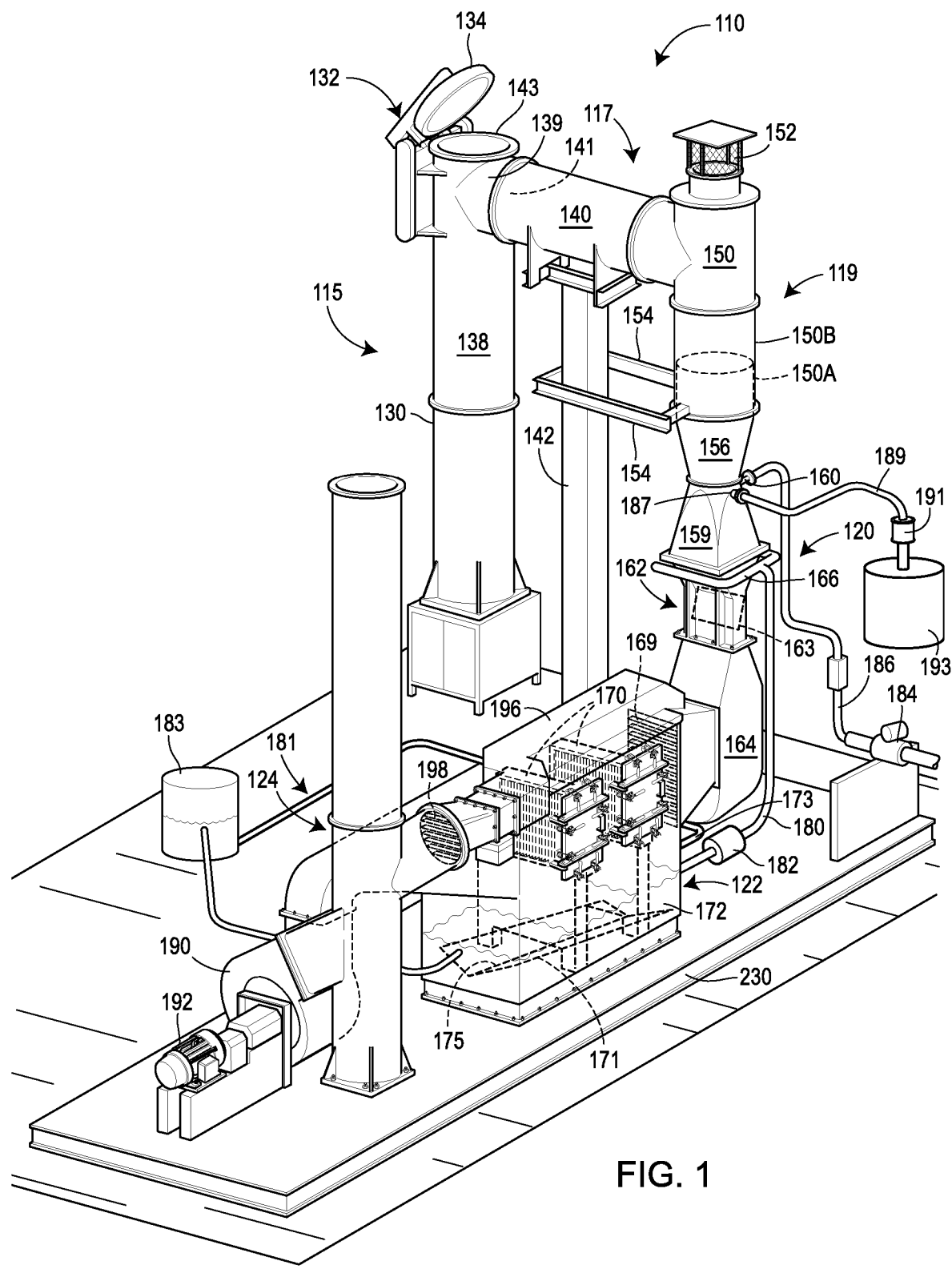
FIG. 1 is a perspective view of a liquid concentrator.

The liquid concentrator described herein may be used to concentrate a wide variety of wastewater streams, such as waste water from industry, runoff water from natural disasters (floods, hurricanes), refinery caustic, leachate such as landfill leachate (e.g., from power plants), flowback water from completion of natural gas wells, produced water from operation of natural gas wells, flue gas desulfurization (FGD) water from power plants (e.g., from an air quality control system (AQCS) process for power plant flue gas or other sulfur dioxide-containing gas), etc. The liquid concentrator is practical, energy efficient, reliable, and cost-effective. The liquid concentrator described herein has all of these desirable characteristics and provides significant advantages over conventional wastewater concentrators, especially when the goal is to manage a broad variety of wastewater streams.

Moreover, the concentrator may be largely fabricated from highly corrosion resistant, yet low cost materials such as fiberglass and/or other engineered plastics. This is due, in part, to the fact that the disclosed concentrator is designed to operate under minimal differential pressure. For example, a differential pressure generally in the range of only 10 to 30 inches water column is required. Also, because the gas-liquid contact zones of the concentration processes generate high turbulence within narrowed (compact) passages at or directly after the venturi section of the flow path, the overall design is very compact as compared to conventional concentrators where the gas liquid contact occurs in large process vessels. As a result, the amount of high alloy metals required for the concentrator is quite minimal. Also, because these high alloy parts are small and can be readily replaced in a short period of time with minimal labor, fabrication costs may be cut to an even higher degree by designing some or all of these parts to be wear items manufactured from lesser quality alloys that are to be replaced at periodic intervals. If desired, these lesser quality alloys (e.g., carbon steel) may be coated with corrosion and/or erosion resistant liners, such as engineered plastics including elastomeric polymers, to extend the useful life of such components. Likewise, pumps may be provided with corrosion and/or erosion resistant liners to extend the life of the pumps, thus further reducing maintenance and replacement costs.

The liquid concentrator provides direct contact of the liquid to be concentrated and the hot gas, effecting highly turbulent heat exchange and mass transfer between hot gas and the liquid, e.g., wastewater, undergoing concentration. Moreover, the concentrator employs highly compact gas-liquid contact zones, making it minimal in size as compared to known concentrators. The direct contact heat exchange feature promotes high energy efficiency and eliminates the need for solid surface heat exchangers as used in conventional, indirect heat transfer concentrators. Further, the compact gas-liquid contact zone eliminates the bulky process vessels used in both conventional indirect and direct heat exchange concentrators. These features allow the concentrator to be manufactured using comparatively low cost fabrication techniques and with reduced weight as compared to conventional concentrators. Both of these factors favor portability and cost-effectiveness. Thus, the liquid concentrator is more compact and lighter in weight than conventional concentrators, which make it ideal for use as a portable unit. Additionally, the liquid concentrator is less prone to fouling and blockages due to the direct contact heat exchange operation and the lack of solid heat exchanger surfaces. The liquid concentrator can also process liquids with significant amounts of suspended solids because of the direct contact heat exchange. As a result, high levels of concentration of the process fluids may be achieved without need for frequent cleaning of the concentrator.

More specifically, in liquid concentrators that employ indirect heat transfer, the heat exchangers are prone to fouling and are subject to accelerated effects of corrosion at the normal operating temperatures of the hot heat transfer medium that is circulated within them (steam or other hot fluid). Each of these factors places significant limits on the durability and/or costs of building conventional indirectly heated concentrators, and on how long they may be operated before it is necessary to shut down and clean or repair the heat exchangers. By eliminating the bulky process vessels, the weight of the liquid concentrators and both the initial costs and the replacement costs for high alloy components are greatly reduced. Moreover, due to the temperature difference between the gas and liquid, the relatively small volume of liquid contained within the system, the relatively large interfacial area between the liquid and the gas, and the reduced relative humidity of the gas prior to mixing with the liquid, the concentrator approaches the adiabatic saturation temperature for the particular gas/liquid mixture, which is typically in the range of about 140 degrees Fahrenheit to about 190 degrees Fahrenheit. This mild operating temperature beyond the evaporation zone is a factor that allows favorable use of low-cost yet highly corrosion-resistant engineered materials of construction throughout the remaining process zones of the concentrator (i.e., which reduces capital costs compared to other wastewater concentrators). The concentrator can be classified as a "low momentum" concentrator, which refers to the high rate at which discharge fluid from the concentrator is recirculated back to the inlet of the evaporation zone, which is typically in the range of 10:1 to 15:1 times the feed rate of wastewater into the concentrator. Multiple passes of the liquid phase add stability to the process by maintaining a high ratio of wastewater undergoing concentration to hot inlet gas volume within the concentrator. This feature prevents drying of small liquid droplets (e.g., at the low end of a droplet particle size distribution characterizing the droplet population in the concentrator) created in the highly turbulent evaporation zone by maintaining a high ratio of liquid to inlet hot gas volume, which causes rapid saturation of the gas phase at close to the adiabatic saturation temperature for the continuous gas phase and discontinuous liquid phase mixture. This approach to thermodynamic equilibrium effectively quenches the driving force for the gaseous stream to absorb additional water and thus prevents complete drying of wastewater droplets which would lead to troublesome buildup of solids upon wetted walls of the processing equipment causing need for frequent and often arduous cleaning cycles. Thus, rather than precisely balancing the injected wastewater feed at the precise level of total solids present in the wastewater at a given point in time, the high recirculation allows the process to self-adjust to variances in the feed wastewater composition without causing process disturbances. Further, this feature stabilizes the concentration process whenever there is need to precisely add reagents to the feed wastewater (e.g., controlling pH, to prevent foaming or sequestering components within the concentrated phase).

Moreover, the concentrator is designed to operate under negative pressure, a feature that greatly enhances the ability to use a very broad range of fuel or waste heat sources as an energy source to affect evaporation. In fact, due to the draft nature of these systems, pressurized or non-pressurized burners may be used to heat and supply the gas used in the concentrator. Further, the simplicity and reliability of the concentrator is enhanced by the minimal number of moving parts and wear parts that are required. In general, only two pumps and a single induced draft fan are required for the concentrator when it is configured to operate on waste heat such as stack gases from engines (e.g., generators or vehicle engines), turbines, industrial process stacks, gas compressor systems, and exhaust stacks, such as landfill gas exhaust stacks, flue gas exhaust stacks, or otherwise. These features provide significant advantages that reflect favorably on the versatility and the costs of buying, operating and maintaining the concentrator.

The concentrator may be run in a transient start up condition, or in a steady state condition. During the startup condition, the demister sump is first filled with wastewater feed. As the level of wastewater feed approaches the normal operating level of the sump, a re-circulating circuit is then established between a lower inlet of the evaporation zone and the outlet of the sump. Once recirculation has been established, wastewater feed to an upper inlet to the evaporation zone is established. Once both recirculating and wastewater feed flows to the lower and upper inlets of the evaporation zone have been established, flow of hot gas to the system is established. During initial processing, the combined fresh wastewater introduced into the upper wastewater inlet and recirculated wastewater introduced to the lower recirculated inlet is at least partially evaporated in a narrowed portion of a concentrator section and is deposited in the demister sump in a more concentrated form than the fresh wastewater. Over time, the wastewater in the demister sump and the re-circulating circuit approaches a desired level of concentration. At this point, the concentrator may be run in a continuous mode where the amount of total solids drawn off from an extraction port equals the amount of total solids introduced in fresh wastewater through the inlet. The balance of total solids generally includes the contribution from total dissolved solids and total suspended solids, for example where the fresh wastewater feed might contain mostly or only dissolved solids, and the concentrated stream drawn from the extraction port might contain a higher fraction of suspended solids having precipitated from dissolved solids during the concentration process. Likewise, the amount of water evaporated within the concentrator is replaced by an equal amount of water in the fresh wastewater. Thus, conditions within the concentrator approach the adiabatic saturation point of the mixture of heated gas and wastewater and continuous operation at a desired equilibrium rate of water removal is established while evaporated water vapor exits the concentrator on the discharge side of the induced draft fan.

Generally, a liquid concentrator may include a gas inlet, a gas exit, and a flow corridor connecting the gas inlet to the gas exit. The flow corridor may include a narrowed portion that accelerates the flow of gas through the flow corridor creating turbulent flow within the flow corridor at or near this location. The narrowed portion may be formed by a venturi device. A liquid inlet injects a liquid to be concentrated (via evaporation) into a liquid concentration chamber in the flow corridor at a point upstream of the narrowed portion, and the injected liquid joins with the gas flow in the flow corridor. The liquid inlet may include one or more replaceable nozzles for spraying the liquid into the flow corridor. The inlet, whether or not equipped with a nozzle, may introduce the liquid in any direction from perpendicular to parallel to the gas flow as the gas moves through the flow corridor. A baffle may also be located near the liquid inlet such that liquid introduced from the liquid inlet impinges on the baffle and disperses into the flow corridor in small droplets.

As the gas and liquid flow through the narrowed portion, the venturi principle creates an accelerated and turbulent flow that thoroughly mixes the gas and liquid in the flow corridor at and after the location of the inlet. This acceleration through the narrowed portion creates shearing forces between the gas flow and the liquid droplets, and between the liquid droplets and the walls of the narrowed portion, resulting in the formation of very fine liquid droplets entrained in the gas, thus increasing the interfacial surface area between the liquid droplets and the gas and effecting rapid mass and heat transfer between the gas and the liquid droplets. The liquid exits the narrowed portion as very fine droplets regardless of the geometric shape of the liquid flowing into the narrowed portion (e.g., the liquid may flow into the narrowed portion as a sheet of liquid). As a result of the turbulent mixing and shearing forces, a portion of the liquid rapidly vaporizes and becomes part of the gas stream. As the gas-liquid mixture moves through the narrowed portion, the direction and/or velocity of the gas/liquid mixture may be changed by an adjustable flow restriction, such as a venturi plate, which is generally used to create a large pressure difference in the flow corridor upstream and downstream of the venturi plate. The venturi plate may be adjustable to control the size and/or shape of the narrowed portion and may be manufactured from a corrosion resistant material including a high alloy metal such as those manufactured under the trade names of HASTELLOY, INCONEL, and MONEL.

After leaving the narrowed portion, the gas-liquid mixture passes through a demister (also referred to as fluid scrubbers or entrainment separators) coupled to the gas exit. The demister removes entrained liquid droplets from the gas stream. The demister includes a gas-flow passage. The removed liquid collects in a liquid collector or sump mounted beneath the gas-flow passage, the sump may also include a reservoir for holding the removed liquid. A pump fluidly coupled to the sump and/or reservoir moves a portion of the liquid through a re-circulating circuit back to the liquid inlet and/or flow corridor. In this manner, the liquid may be reduced through evaporation to a desired concentration. Fresh or new liquid to be concentrated is input to the re-circulating circuit through a liquid inlet. This new liquid may instead be injected directly into the flow corridor upstream of the venturi plate. The rate of fresh liquid input into the re-circulating circuit may be equal to the rate of evaporation of the liquid as the gas-liquid mixture flows through the flow corridor plus the rate of liquid extracted through a concentrated fluid extraction port located in or near the reservoir in the sump. The concentrated fluid extracted through port can be fed to one or more downstream unit operations (e.g., solid/liquid separation, further processing in a stabilization/solidification (S/S) process, etc.). The ratio of re-circulated liquid to fresh liquid may generally be in the range of approximately 1:1 to approximately 100:1, and is usually in the range of approximately 5:1 to approximately 25:1. For example, if the re-circulating circuit circulates fluid at approximately 10 gal/min, fresh or new liquid may be introduced at a rate of approximately 1 gal/min (i.e., a 10:1 ratio). A portion of the liquid may be drawn off through the extraction port when the liquid in the re-circulating circuit reaches a desired concentration. The re-circulating circuit adds stability to the evaporation process ensuring that enough moisture is always present in the flow corridor to prevent the liquid from being completely evaporated and/or preventing the formation of dry particulate.

After passing through the demister the gas stream passes through an induction fan that draws the gas through the flow corridor and demister gas-flow corridor under negative pressure. Of course, the concentrator could operate under positive pressure produced by a blower prior to the liquid inlet. Finally, the gas is vented to the atmosphere or directed for further processing such as for return for collection of clean water by means of condensation through the gas exit.

The concentrator may include a pre-treatment system for treating the liquid to be concentrated, which may be a wastewater feed. For example, an air stripper may be used as a pre-treatment system to remove substances that may produce foul odors or be regulated as air pollutants. In this case, the air stripper may be any conventional type of air stripper or may be a further concentrator of the type described herein, which may be used in series as the air stripper. The pre-treatment system may, if desired, heat the liquid to be concentrated using any desired heating technique. Additionally, the gas and/or wastewater feed circulating through the concentrator may be pre-heated in a pre-heater. Pre-heating may be used to enhance the rate of evaporation and thus the rate of concentration of the liquid. The gas and/or wastewater feed may be pre-heated through combustion of renewable fuels such as wood chips, bio-gas, methane, or any other type of renewable fuel or any combination of renewable fuels, fossil fuels and waste heat. Furthermore, the gas and/or wastewater may be pre-heated through the use of waste heat generated in a landfill flare or stack. Also, waste heat from an engine, such as an internal combustion engine, or a gas turbine, may be used to pre-heat the gas and/or wastewater feed. Still further, natural gas may be used as a source of waste heat, the natural gas may be supplied directly from a natural gas well head in an unrefined condition either immediately after completion of the natural gas well before the gas flow has stabilized or after the gas flow has stabilized in a more steady state natural gas well. Optionally, the natural gas may be refined before being combusted in the flare. Additionally, the gas streams ejected from the gas exit of the concentrator may be transferred into a flare or other post treatment device which treats the gas before releasing the gas to the atmosphere.

FIG. 1 illustrates one particular embodiment of a (compact) liquid concentrator 110, which can be connected to a source of waste heat in the form of a gas flare exhaust stack 130. Generally speaking, the compact liquid concentrator 110 of FIG. 1 operates to concentrate wastewater, such as flowback or produced water from a natural gas well, using exhaust or waste heat created by burning natural gas in the gas flare exhaust stack 130. Typically, the heated gas exiting from the exhaust stack ranges from about 300 or 400 to 500, 600, or 700 degrees Fahrenheit, although higher temperatures are possible, such as up to 800, 1000, 1200, 1500, or 1800 degrees Fahrenheit.

As illustrated in FIG. 1, the compact liquid concentrator 110 generally includes an inlet assembly 119, a concentrator assembly 120 (shown in more detail in FIG. 2), a demister or fluid scrubber 122, and an outlet (or exhaust) section 124. For example, the concentrator 110 inlet assembly 119 can be interfaced with the gas flare exhaust stack 130 via ductwork and a butterfly control valve (or similar; not shown) that isolates the concentrator 110 when closed and allows for hot flue gas to be drawn in when open. Similarly, a bypass valve (not shown) can be included to operate in the opposite fashion. When the concentrator 110 shuts down, the bypass valve may open to equilibrate the concentrator 110 to atmosphere conditions and help purge the concentrator 110 of any remnant flue gases.

The liquid concentrator assembly 120 includes a lead-in section 156 having a reduced cross-section at the top end thereof which mates to the bottom of the piping section of the inlet assembly 119 (e.g., delivering a hot gas such as exhaust gas from the gas flare exhaust stack 130) to a quencher 159 of the concentrator assembly 120. The concentrator assembly 120 also includes a first fluid inlet 160, which injects new or untreated liquid to be concentrated, such as flowback or produced water from a natural gas well, into the interior of the quencher 159. While not shown in FIG. 1, the inlet 160 may include a coarse sprayer with a large nozzle for spraying the untreated liquid into the quencher 159. Because the liquid being sprayed into the quencher 159 at this point in the system is not yet concentrated, and thus has large amount of water therein, and because the sprayer is a coarse sprayer, the sprayer nozzle is not subject to fouling or being clogged by the small particles within the liquid. The quencher 159 operates to quickly reduce the temperature of the gas stream (e.g., from about 300 or 400 to 500, 600, 700, or 900 degrees Fahrenheit to less than 200 degrees Fahrenheit) while performing a high degree of evaporation on the liquid injected at the inlet 160. If desired, but not specifically shown in FIG. 1, a temperature sensor may be located at or near the exit of the inlet assembly 119 or in the quencher 159 and may be used to control the position of an ambient air valve (not shown) in the inlet assembly 119 to thereby control the temperature of the gas present at the inlet of the concentrator assembly 120.

Figure 2:
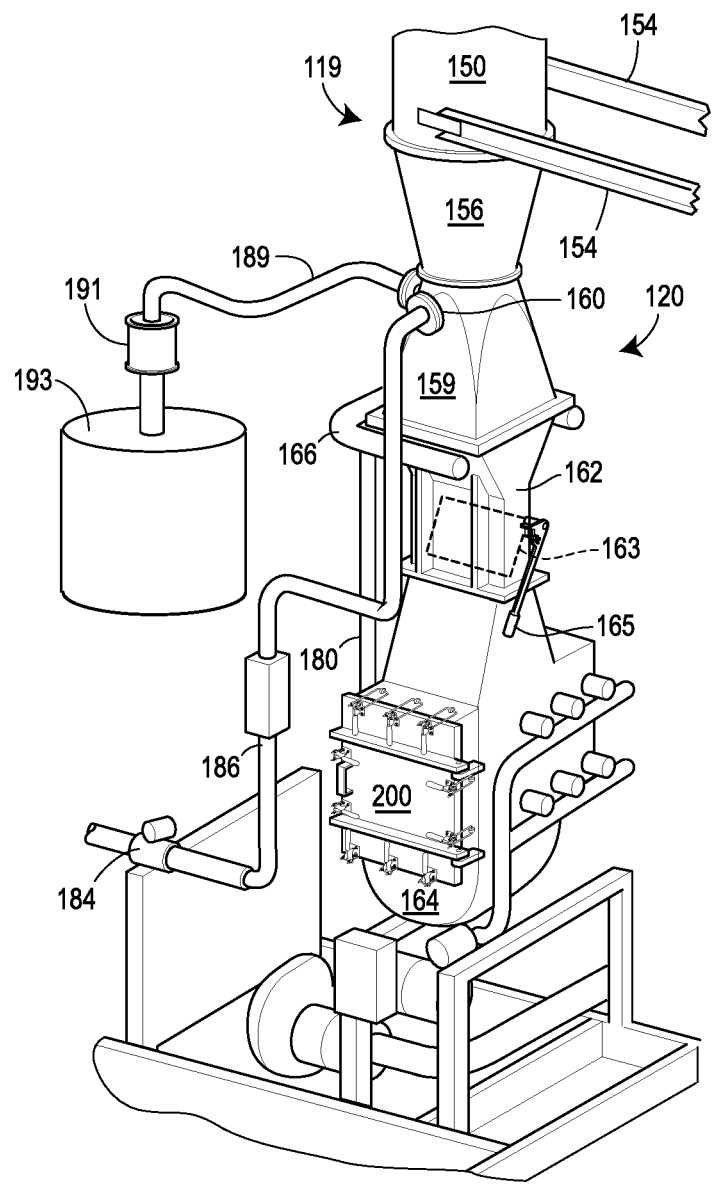
FIG. 2 is a front perspective view of an evaporator/concentrator portion of the liquid concentrator of FIG. 1.

As shown in FIGS. 1 and 2, the quencher 159 is connected to a liquid injection chamber which is connected to narrowed portion or venturi section 162 which has a narrowed cross section with respect to the quencher 159 and which has a venturi plate 163 (shown in dotted line) disposed therein. The venturi plate 163 creates a narrow passage through the venturi section 162, which creates a large pressure drop between the entrance and the exit of the venturi section 162. This large pressure drop causes turbulent gas flow and shearing forces within the quencher 159 and the top or entrance of the venturi section 162, and causes a high rate of gas flow out of the venturi section 162, both of which lead to thorough mixing of the gas and liquid in the venturi section 162. The position of the venturi plate 163 may be controlled with a manual control rod 165 (shown in FIG. 2) connected to the pivot point of the plate 163, or via an automatic positioner that may be driven by an electric motor or pneumatic cylinder (not shown in FIG. 2).

A re-circulating pipe 166 extends around opposite sides of the entrance of the venturi section 162 and operates to inject partially concentrated (i.e., re-circulated) liquid into the venturi section 162 to be further concentrated and/or to prevent the formation of dry particulate within the concentrator assembly 120 through multiple fluid entrances located on one or more sides of the flow corridor. While not explicitly shown in FIGS. 1 and 2, a number of pipes, such as three pipes of, for example, ½ inch diameter, may extend from each of the opposites legs of the pipe 166 partially surrounding the venturi section 162, and through the walls and into the interior of the venturi section 162. Because the liquid being ejected into the concentrator 110 at this point is re-circulated liquid, and is thus either partially concentrated or being maintained at a particular equilibrium concentration and more prone to plug a spray nozzle than the less concentrated liquid injected at the inlet 160, this liquid may be directly injected without a sprayer so as to prevent clogging. However, if desired, a baffle in the form of a flat plate may be disposed in front of each of the openings of the ½ diameter pipes to cause the liquid being injected at this point in the system to hit the baffle and disperse into the concentrator assembly 120 as smaller droplets. In any event, the configuration of this re-circulating system distributes or disperses the re-circulating liquid better within the gas stream flowing through the concentrator assembly 120.

The combined hot gas and liquid flows in a turbulent manner through the venturi section 162. As noted above, the venturi section 162, which has a moveable venturi plate 163 disposed across the width of the concentrator assembly 120, causes turbulent flow and complete mixture of the liquid and gas, causing rapid evaporation of the discontinuous liquid phase into the continuous gas phase. Because the mixing action caused by the venturi section 162 provides a high degree of evaporation, the gas cools substantially in the concentrator assembly 120, and exits the venturi section 162 into a flooded elbow 164 at high rates of speed. In fact, the temperature of the gas-liquid mixture at this point may be about 160 degrees Fahrenheit.

A weir arrangement (not shown) within the bottom of the flooded elbow 164 may maintain a constant level of partially or fully concentrated re-circulated liquid disposed therein. Droplets of re-circulated liquid that are entrained in the gas phase as the gas-liquid mixture exits the venturi section 162 at high rates of speed are thrown outward onto the surface of the re-circulated liquid held within the bottom of the flooded elbow 164 by centrifugal force generated when the gas-liquid mixture is forced to turn 90 degrees to flow into the fluid scrubber 122. Significant numbers of liquid droplets entrained within the gas phase that impinge on the surface of the re-circulated liquid held in the bottom of the flooded elbow 164 coalesce and join with the re-circulated liquid thereby increasing the volume of re-circulated liquid in the bottom of the flooded elbow 164 causing an equal amount of the re-circulated liquid to overflow the weir arrangement and flow by gravity into the sump 172 at the bottom of the fluid scrubber 122. Thus, interaction of the gas-liquid stream with the liquid within the flooded elbow 164 removes liquid droplets from the gas-liquid stream, and also prevents suspended particles within the gas-liquid stream from hitting the bottom of the flooded elbow 164 at high velocities, thereby preventing erosion of the metal that forms the portions of side walls located beneath the level of the weir arrangement and the bottom of the flooded elbow 164.

After leaving the flooded elbow 164, the gas-liquid stream in which evaporated liquid and some liquid and other particles still exist, flows through the fluid scrubber 122 which is, in this case, a cross-flow fluid scrubber. The fluid scrubber 122 includes various screens or filters which serve to remove entrained liquids and other particles from the gas-liquid stream. In one particular example, the cross flow scrubber 122 may include an initial coarse impingement baffle 169 at the input thereof, which is designed to remove liquid droplets in the range of 50 to 100 microns in size or higher. Thereafter, two removable filters in the form of chevrons 170 are disposed across the fluid path through the fluid scrubber 122, and the chevrons 170 may be progressively sized or configured to remove liquid droplets of smaller and smaller sizes, such as 20-30 microns and less than 10 microns. Of course, more or fewer filters or chevrons could be used.

Liquid captured by the filters 169 and 170 and the overflow weir arrangement within the bottom of the flooded elbow 164 drain by gravity into a reservoir or sump 172 located at the bottom of the fluid scrubber 122. The sump 172, which may hold, for example approximately 200 gallons of liquid, thereby collects concentrated fluid containing dissolved and suspended solids removed from the gas-liquid stream and operates as a reservoir for a source of re-circulating concentrated liquid back to the concentrator assembly 120 to be further treated and/or to prevent the formation of dry particulate within the concentrator assembly 120. In one embodiment, the sump 172 may include a sloped V-shaped bottom 171 having a V-shaped groove 175 extending from the back of the fluid scrubber 122 (furthest away from the flooded elbow 164) to the front of the fluid scrubber 122 (closest to the flooded elbow 164), wherein the V-shaped groove 175 is sloped such that the bottom of the V-shaped groove 175 is lower at the end of the fluid scrubber 122 nearest the flooded elbow 164 than at an end farther away from the flooded elbow 164. In other words, the V-shaped bottom 171 may be sloped with the lowest point of the V-shaped bottom 171 proximate the exit port 173 and/or the pump 182. Additionally, a washing circuit 177 (FIG. 3) may pump concentrated fluid from the sump 172 to a sprayer 179 within the cross flow scrubber 122, the sprayer 179 being aimed to spray liquid at the V-shaped bottom 171. Alternatively, the sprayer 179 may spray un-concentrated liquid or clean water at the V-shaped bottom 171. The sprayer 179 may periodically or constantly spray liquid onto the surface of the V-shaped bottom 171 to wash solids and prevent solid buildup on the V-shaped bottom 171 or at the exit port 173 and/or the pump 182. As a result of this V-shaped sloped bottom 171 and washing circuit 177, liquid collecting in the sump 172 is continuously agitated and renewed, thereby maintaining a relatively constant consistency and maintaining solids in suspension. If desired, the spraying circuit 177 may be a separate circuit using a separate pump with, for example, an inlet inside of the sump 172, or may use a pump 182 associated with a concentrated liquid re-circulating circuit described below to spray concentrated fluid from the sump 172 onto the V-shaped bottom 171.

As illustrated in FIG. 1, a return line 180, as well as a pump 182, operate to re-circulate fluid removed from the gas-liquid stream from the sump 172 back to the concentrator 120 and thereby complete a fluid or liquid re-circulating circuit. Likewise, a pump 184 may be provided within an input line 186 to pump new or untreated liquid, such as flowback or produced water from a natural gas well, or otherwise, to the input 160 of the concentrator assembly 120. Also, one or more sprayers may be disposed inside the fluid scrubber 122 adjacent the chevrons 170 and may be operated periodically to spray clean water or a portion of the wastewater feed on the chevrons 170 to keep them clean.

Concentrated liquid also may be removed from the bottom of the fluid scrubber 122 via the exit port 173 and may be further processed or disposed of in any suitable manner in a secondary re-circulating circuit 181. In particular, the concentrated liquid removed by the exit port 173 contains a certain amount of suspended solids, which preferably may be separated from the liquid portion of the concentrated liquid and removed from the system using the secondary re-circulating circuit 181. For example, concentrated liquid removed from the exit port 173 may be transported through the secondary re-circulating circuit 181 to one or more solid/liquid separating devices 183, such as settling tanks, vibrating screens, rotary vacuum filters, horizontal belt vacuum filters, belt presses, filter presses, and/or hydrocyclones. After the suspended solids and liquid portion of the concentrated wastewater are separated by the solid/liquid separating device 183, the liquid portion of the concentrated wastewater with suspended particles substantially removed may be returned to the sump 172 for further processing in the first or primary re-circulating circuit connected to the concentrator.

The gas, which flows through and out of the fluid scrubber 122 with the liquid and suspended solids removed therefrom, exits out of piping or ductwork at the back of the fluid scrubber 122 (downstream of the chevrons 170) and flows through an induced draft fan 190 of the outlet assembly 124, where it may be recycled to a different process, or exhausted to the atmosphere in the form of the cooled hot inlet gas mixed with the evaporated water vapor. Of course, an induced draft fan motor 192 is connected to and operates the fan 190 to create negative pressure within the fluid scrubber 122 so as to ultimately draw gas through the inlet assembly 119 and the concentrator assembly 120. The induced draft fan 190 needs only to provide a slight negative pressure within the fluid scrubber 122 to assure proper operation of the concentrator 110.

While the speed of the induced draft fan 190 can be varied by a device such as a variable frequency drive operated to create varying levels of negative pressure within the fluid scrubber 122 and thus can usually be operated within a range of gas flow capacity to assure complete gas flow through the inlet assembly 119. If the gas flowing in through the inlet assembly 119 is not of sufficient quantity, the operation of the induced draft fan 190 cannot necessarily be adjusted to assure a proper pressure drop across the fluid scrubber 122 itself. That is, to operate efficiently and properly, the gas flowing through the fluid scrubber 122 must be at a sufficient (minimal) flow rate at the input of the fluid scrubber 122. Typically this requirement is controlled by keeping at least a preset minimal pressure drop across the fluid scrubber 122. However, if at least a minimal level of gas is not flowing in through the inlet assembly 119, increasing the speed of the induced draft fan 190 will not be able to create the required pressure drop across the fluid scrubber 122.

To compensate for this situation, the cross flow scrubber 122 may optionally be designed to include a gas re-circulating circuit which can be used to assure that enough gas is present at the input of the fluid scrubber 122 to enable the system to acquire the needed pressure drop across the fluid scrubber 122. In particular, the gas re-circulating circuit includes a gas return line or return duct 196 which connects the high pressure side of the outlet assembly 124 (e.g., downstream of the induced draft fan 190) to the input of the fluid scrubber 122 (e.g., a gas input of the fluid scrubber 122) and a baffle or control mechanism 198 disposed in the return duct 196 which operates to open and close the return duct 196 to thereby fluidly connect the high pressure side of the outlet assembly 124 to the input of the fluid scrubber 122. During operation, when the gas entering into the fluid scrubber 122 is not of sufficient quantity to obtain the minimal required pressure drop across the fluid scrubber 122, the baffle 198 (which may be, for example, a gas valve, a damper such as a louvered damper, etc.) is opened to direct gas from the high pressure side of the outlet assembly 124 (i.e., gas that has traveled through the induced draft fan 190) back to the input of the fluid scrubber 122. This operation thereby provides a sufficient quantity of gas at the input of the fluid scrubber 122 to enable the operation of the induced draft fan 190 to acquire the minimal required pressure drop across the fluid scrubber 122.

Figure 3:
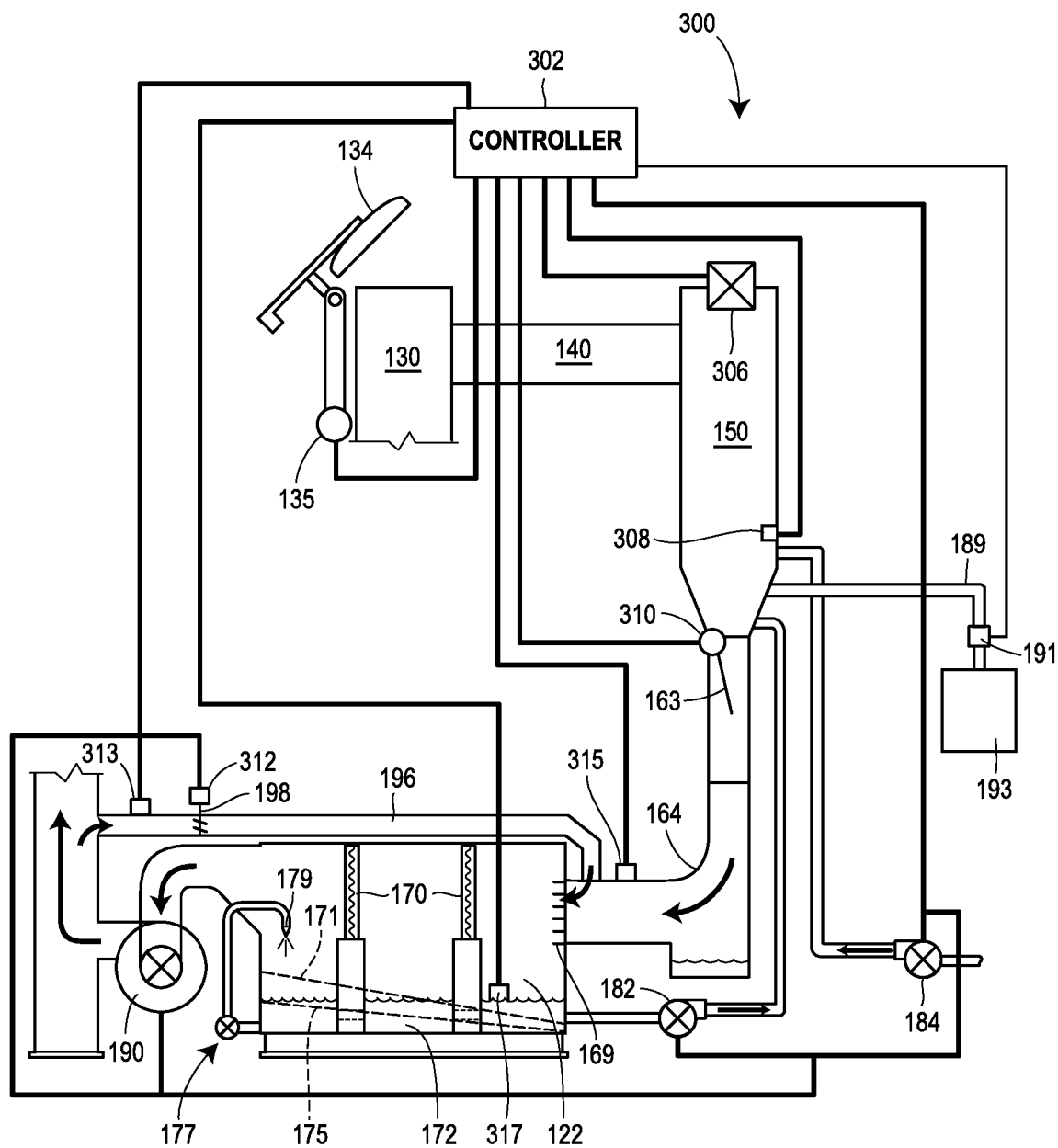
FIG. 3 is a schematic view of a control system for the liquid concentrator of FIG. 1.

The combination of features illustrated in FIGS. 1-3 makes for a compact fluid concentrator 110 that uses exhaust heat, for example in the form of exhaust gas from a natural gas flare, which waste heat might otherwise be vented directly to the atmosphere. Importantly, the concentrator 110 uses only a minimal amount of expensive high temperature resistant material to provide the piping and structural equipment required to accommodate potentially high temperature gases entering the concentrator via the inlet assembly 119. In fact, due to the rapid cooling that takes place in the venturi section 162 of the concentrator assembly 120, the venturi section 162, the flooded elbow 164 and the fluid scrubber 122 are typically cool enough to touch without harm (even when the gases exiting the exhaust stack 130 are at 1800 degrees Fahrenheit). Rapid cooling of the gas-liquid mixture allows the use of generally lower cost materials that are easier to fabricate and that are corrosion resistant. Moreover, parts downstream of the flooded elbow 164, such as the fluid scrubber 122, induced draft fan 190, and exhaust section 124 may be fabricated from materials such as fiberglass.

The fluid concentrator 110 is also a very fast-acting concentrator. Because the concentrator 110 is a direct contact type of concentrator, it is not subject to deposit buildup, clogging and fouling to the same extent as most other concentrators.

Moreover, in some embodiments, due to the compact configuration of the inlet assembly 119, the concentrator assembly 120 and the fluid scrubber 122, parts of the concentrator assembly 120, the fluid scrubber 122, the draft fan 190 and at least a lower portion of the exhaust section 124 can be permanently mounted on (connected to and supported by) a skid or plate 230, as illustrated in FIG. 1. The upper parts of the concentrator assembly 120 and/or the inlet assembly 119 may be removed and stored on the skid or plate 230 for transport, or may be transported in a separate truck. Because of the manner in which the lower portions of the concentrator 110 can be mounted to a skid or plate, the concentrator 110 is easy to move and install. In particular, during set up of the concentrator 110, the skid 230, with the fluid scrubber 122, the flooded elbow 164 and the draft fan 190 mounted thereon, may be offloaded at the site at which the concentrator 110 is to be used by simply offloading the skid 230 onto the ground or other containment area at which the concentrator 110 is to be assembled. Thereafter, the venturi section 162, the quencher 159, and the inlet assembly 119 may be placed on top of and attached to the flooded elbow 164. In other embodiments, the concentrator 110 can be part of a larger scale, permanent installation (e.g., not necessarily mounted on a moveable skid or plate).

Because most of the pumps, fluid lines, sensors and electronic equipment are disposed on or are connected to the fluid concentrator assembly 120, the fluid scrubber 122 or the draft fan assembly 190 (e.g., in a compact, skid-mounted embodiment), setup of the concentrator 110 at a particular site requires only minimal plumbing, mechanical, and electrical work at the site. As a result, the concentrator 110 is relatively easy to install and to set up at (and to disassemble and remove from) a particular site. Moreover, because a majority of the components of the concentrator 110 are permanently mounted to the skid 230, the concentrator 110 can be easily transported on a truck or other delivery vehicle and can be easily dropped off and installed at particular location, such as next to an gas flare at a natural gas well, next to a landfill exhaust stack, or at a power plant to concentrate FGD wastewater.

FIG. 3 illustrates a schematic diagram of a control system 300 that may be used to operate the concentrator 110. As illustrated in FIG. 3, the control system 300 includes a controller 302, which may be a form of digital signal processor type of controller, a programmable logic controller (PLC) which may run, for example, ladder logic based control, or any other type of controller. The controller 302 is, of course, connected to various components within the concentrator 110, for example as described below.

For instance, the controller 302 may be connected to and control the ambient air inlet valve 306 disposed in the inlet assembly 119 of FIG. 1 upstream of the venturi section 162 and may be used to control the pumps 182 and 184 which control the amount of and the ratio of the injection of new liquid to be treated and the re-circulating liquid being treated within the concentrator 110. The controller 302 may be operatively connected to a sump level sensor 317 (e.g., a float sensor, a non-contact sensor such as a radar or sonic unit, or a differential pressure cell). The controller 302 may use a signal from the sump level sensor 317 to control the pumps 182 and 184 to maintain the level of concentrated fluid within the sump 172 at a predetermined or desired level. Also, the controller 302 may be connected to the induced draft fan 190 to control the operation of the fan 190, which may be a single speed fan, a variable speed fan or a continuously controllable speed fan. In one embodiment, the induced draft fan 190 is driven by a variable frequency motor, so that the frequency of the motor is changed to control the speed of the fan. Moreover, the controller 302 may be connected to a temperature sensor 308 disposed at, for example, the inlet of the concentrator assembly 120 or at the inlet of the venturi section 162, and receive a temperature signal generated by the temperature sensor 308. The temperature sensor 308 may alternatively be located downstream of the venturi section 162 or the temperature sensor 308 may include a pressure sensor for generating a pressure signal.

In any event, as illustrated in FIG. 3, the controller 302 may also be connected to a motor 310 which drives or controls the position of the venturi plate 163 within the narrowed portion of the concentrator assembly 120 to control the amount of turbulence caused within the concentrator assembly 120. Still further, the controller 302 may control the operation of the pumps 182 and 184 to control the rate at which (and the ratio at which) the pumps 182 and 184 provide re-circulating liquid and new waste fluid to be treated to the inputs of the quencher 159 and the venturi section 162. In one embodiment, the controller 302 may control the ratio of the re-circulating fluid to new fluid to be about 10:1, so that if the pump 184 is providing 8 gallons per minute of new liquid to the input 160, the re-circulating pump 182 is pumping 80 gallons per minute. Additionally, or alternatively, the controller 302 may control the flow of new liquid to be processed into the concentrator (via the pump 184) by maintaining a constant or predetermined level of concentrated liquid in the sump 172 using, for example, the level sensor 317. Of course, the amount of liquid in the sump 172 will be dependent on the rate of concentration in the concentrator, the rate at which concentrated liquid is pumped from or otherwise exists the sump 172 via the secondary re-circulating circuit and the rate at which liquid from the secondary re-circulating circuit is provided back to the sump 172, as well as the rate at which the pump 182 pumps liquid from the sump 172 for delivery to the concentrator via the primary re-circulating circuit.

Furthermore, as illustrated in the FIG. 3, the controller 302 may be connected to the venturi plate motor 310 or other actuator which moves or actuates the angle at which the venturi plate 163 is disposed within the venturi section 162. Using the motor 310, the controller 302 may change the angle of the venturi plate 163 to alter the gas flow through the concentrator assembly 120, thereby changing the nature of the turbulent flow of the gas through concentrator assembly 120, which may provide for better mixing of the and liquid and gas therein and obtain better or more complete evaporation of the liquid. In this case, the controller 302 may operate the speed of the pumps 182 and 184 in conjunction with the operation of the venturi plate 163 to provide for optimal concentration of the wastewater being treated. Thus, the controller 302 may coordinate the position of the venturi plate 163 with the operation of the exhaust stack cap 134, the position of the ambient air or bleed valve 306, and the speed of the induction fan 190 to maximize wastewater concentration (turbulent mixing) without fully drying the wastewater so as to prevent formation of dry particulates. The controller 302 may use pressure inputs from the pressure sensors to position the venturi plate 163. Of course, the venturi plate 163 may be manually controlled or automatically controlled.

The controller 302 may also be connected to a motor 312 which controls the operation of the damper 198 in the gas re-circulating circuit of the fluid scrubber 122. The controller 302 may cause the motor 312 or other type of actuator to move the damper 198 from a closed position to an open or to a partially open position based on, for example, signals from pressure sensors 313, 315 disposed at the gas entrance and the gas exit of the fluid scrubber 122. The controller 302 may control the damper 198 to force gas from the high pressure side of the exhaust section 124 (downstream of the induced draft fan 190) into the fluid scrubber entrance to maintain a predetermined minimum pressure difference between the two pressure sensors 313, 315. Maintaining this minimum pressure difference assures proper operation of the fluid scrubber 122. Of course, the damper 198 may be manually controlled instead or in addition to being electrically controlled.

The controller 302 may implement one or more on/off control loops used to start up or shut down the concentrator 110. For example, the controller 302 may implement an induced draft fan control loop which starts or stops the induced draft fan 190 based on whether the concentrator 110 is being started or stopped. Moreover, during operation, the controller 302 may implement one or more on-line control loops which may control various elements of the concentrator 110 individually or in conjunction with one another to provide for better or optimal concentration. When implementing these on-line control loops, the controller 302 may control the speed of induced draft fan 190, the position or angle of the venturi plate 163, and/or the position of the ambient air valve 306 to control the fluid flow through the concentrator 110, and/or the temperature of the air at the inlet of the concentrator assembly 120 based on signals from the temperature and pressure sensors. Moreover, the controller 302 may maintain the performance of the concentration process at steady-state conditions by controlling the pumps 184 and 182 which pump new and re-circulating fluid to be concentrated into the concentrator assembly 120. Still further, the controller 302 may implement a pressure control loop to control the position of the damper 198 to assure proper operation of the fluid scrubber 122. Of course, while the controller 302 is illustrated in FIG. 3 as a single controller device that implements these various control loops, the controller 302 could be implemented as multiple different control devices by, for example, using multiple different PLCs.

Referring again to FIG. 1, the concentrator section 120 may include a reagent inlet 187 that is connected to a supply of reagent material 193 (e.g., a pH-adjusting agent such as an alkaline agent) by a supply line 189. A pump 191 may pressurize the supply line 189 with reagent material from the supply of reagent material 193 so that the reagent material is injected into the concentrator section 120 (e.g., proximate the venturi 162) to mix with the exhaust gas from the exhaust stack 130 or generator. In other embodiments, the reagent material may be mixed with the flue gas desulfurization water in the wastewater input line 186 prior to being delivered to the concentrator section 120. Regardless, once the reagent material is delivered to the concentrator section 120, the reagent material rapidly mixes with the exhaust gas in the concentrator section 120 along with the wastewater, as described above. As illustrated in FIG. 3, the controller 302 may be operatively connected to the pump 191 to control the rate at which reagent material is metered into the concentrator section 120. The controller 302 may determine a proper metering rate for the reagent based. Thus, the disclosed concentrator is readily adaptable to variations in exhaust gas components and/or differing mass flow rates of the exhaust gas. As a result, the disclosed concentrator is capable of simultaneously concentrating flue gas desulfurization water and removing pollutants from the same.

Generally, liquid concentrated in the concentrator 110 will eventually reach a state where the concentrate is saturated with dissolved solids. Concentration beyond this point will cause some of the dissolved solids to precipitate out of the solution as suspended solids. The point of saturation will depend on the types of dissolved solids in the wastewater. The suspended solids are kept in suspension in the concentrator 110 due to the mixing action created therein. However, it may be desirable to extract these suspended solids and to dispose of the suspended solids in a landfill or otherwise. The suspended solids may be extracted from the settling tank 183 and may optionally be stabilized, for example by mixing with Portland cement, prior to disposal in a landfill.

Often, natural well operations (and drilling) require heavy waters (known as drilling muds) to aid in drilling and extraction operations. Usually, these heavy waters are created by dissolving heavy soluble salts (such as salts including Barium and other heavy elements) with water to create water that weighs 10 lb/gal or more (known in the industry as 10 lb brine water). This method of manufacturing heavy brine waters for drilling is expensive because the heavy salts are expensive. Generally, drilling operations desire waters that are as heavy as possible because heavier waters improve drilling and extracting operations.

The concentrator 110 described above has been found to have the capability to manufacture heavy brine waters for the drilling industry. In some cases, the concentrator 110 may be used to manufacture heavy brine waters in excess of 12 lb/gal or more, which are highly desirable in the drilling industry. The inventors have discovered that by modifying the settling tank 183 (FIG. 1) with a mixing system, the concentrator 110 is capable of manufacturing custom heavy brine waters to suit a customer's specifications.

Figure 4:
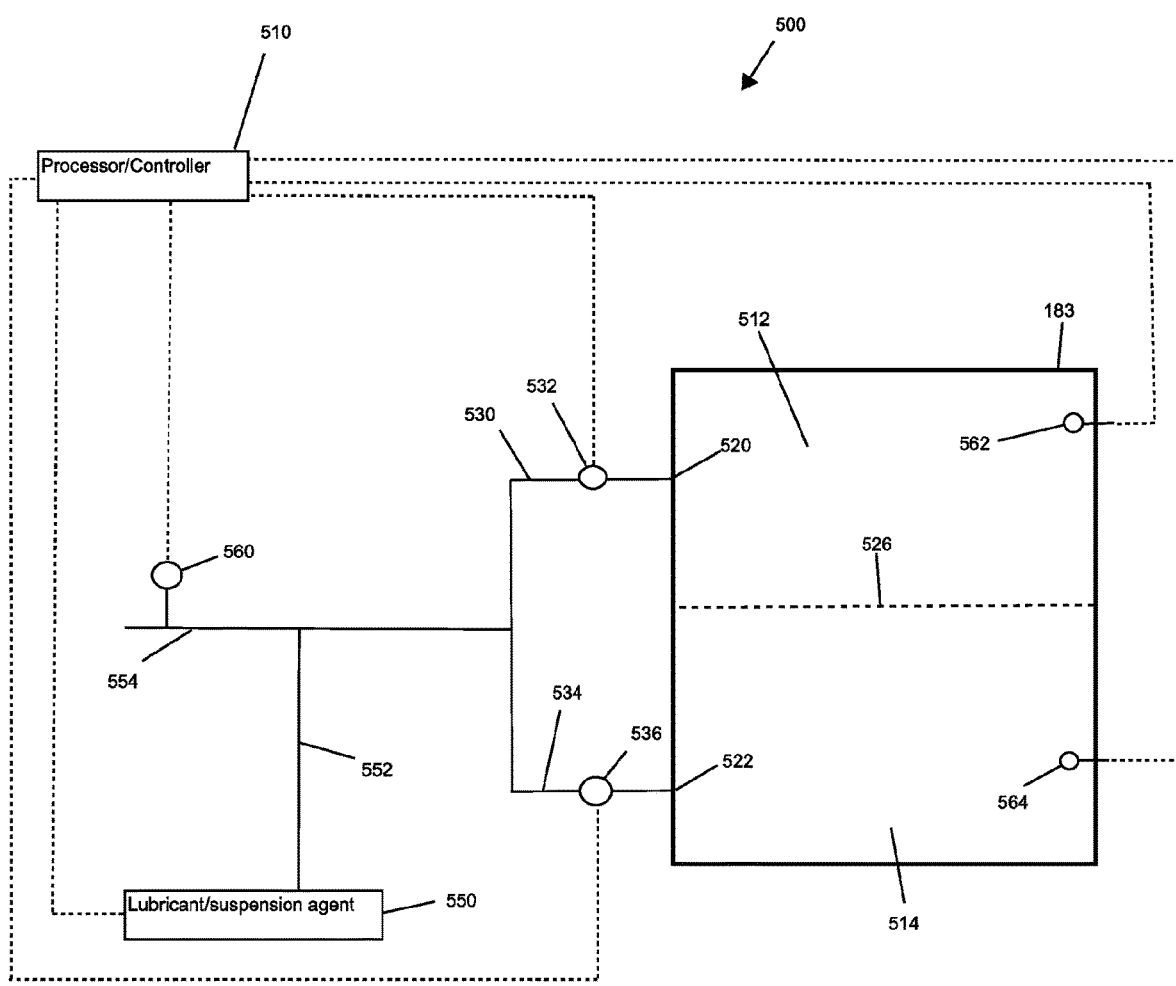
FIG. 4 is a close up schematic view of the settling tank of the liquid concentrator of FIG. 1 and of a custom brine mixing system.

Turing now to FIG. 4, a mixing system 500 for creating custom heavy brine waters is illustrated. The mixing system 500 includes the settling tank 183 of the concentrator 110, and a processor/controller 510.

When concentrated liquid is sent to the settling tank 183 from the sump 172 (FIG. 1), and the concentrated liquid is allowed to sit quietly in the settling tank 183, eventually suspended solids will be drawn to the bottom of the settling tank 183 via gravity and liquid saturated with dissolved solids will rise to the top of the settling tank 183 due to the differences in weights between the two. This phenomenon results in generally two regions within the settling tank 183. The first region is the top region or saturated liquid region 512 and the second region is the bottom region or the settled solids region 514. The weight of the liquid in the saturated liquid region 512 is generally less than the weight of an identical volume of settled solids from the settled solids region 514. For example, depending upon the dissolved solids in the wastewater to begin with, the weight of the saturated liquid may be between 9 lb/gal and 11 lb/gal, while the weight of the settled solids may be between 12 lb/gal and 14 lb/gal.

By mixing desired ratios of the saturated liquid with the settled solids, brines of custom weights may be manufactured to suit the needs of the drilling industry. For example, if the weight of the saturated liquid is 10 lb/gal and the weight of the settled solids is 12 lb/gal, and if a customer desires a custom brine having a weight of 11 lb/gal, then equal amounts of the saturated liquid and the settled solids may be mixed to create a brine with a weight of 11 lb/gal. The disclosed mixing system 500 performs this function.

In addition to the settling tank 183 and the controller/processor 510, the mixing system 500 includes a saturated liquid extraction port 520 and a settled solids extraction port 522. The saturated liquid extraction port 520 is located in the upper half or the settling tank 183, above a solid/liquid separation line 526. The saturated liquid extraction port 520 is connected to a saturated liquid line 530. A saturated liquid valve 532 is located within the saturated liquid line 530 and the saturated liquid valve 532 controls the flow of saturated liquid through the saturated liquid line 530. Similarly, the settled solids extraction port 522 is connected to a saturated solids line 534. A settled solids valve 536 is located within the settled solids line 534 and the settled solids valve 536 controls the flow of settled solids through the settled solids line 534. The controller/processor 510 may be operatively connected to the saturated liquid valve 532 and to the settled solids valve 536. The controller/processor 510 controls the saturated liquid valve 532 and the settled solids valve 536 to control the ratio of saturated liquid to settled solids to achieve a mixture of the two having a desired weight.

The mixing system 500 may optionally include a means for injecting a lubricant or suspension agent into the mixture of saturated liquid and settled solids to keep the settled solids in suspension in the mixture. For example, the mixing system 500 may include a source of lubricant/suspension agent 550 that is connected to a mixture line 552 downstream of the junction of the saturated liquid line 530 and the settled solids line 534. The processor/controller 510 may be operatively connected to the source of lubricant/suspension agent 550 to periodically, or continuously, dose the mixture with lubricant/suspension agent to assist in keeping the settled solids in suspension.

The processor/controller 510 may also be operatively connected to a weight sensor 560, located in the mixture line 554 so that the controller/processor 510 has a feedback mechanism to adjust amounts of the saturated liquid and the settled solids to achieve the desired mixture weight. Furthermore, the controller/processor 510 may be operatively connected to a saturated liquid sensor 562 and to a settled solids sensor 564 to monitor the weights of the saturated liquid and the settled solids to account for changes in the makeup of wastewater being concentrated and thus the weights of the saturated liquid and the settled solids.

While certain representative embodiments and details have been shown for purposes of illustrating the invention, it will be apparent to those skilled in the art that various changes in the methods and apparatus disclosed herein may be made without departing from the scope of the invention.

The invention claimed is:

1. A liquid concentrator system, comprising:
a concentrator section including;
    a gas inlet,
    a gas outlet,
    a mixing corridor disposed between the gas inlet and the gas outlet, the mixing corridor having a narrowed portion in which gas flow within the mixing corridor accelerates when traveling from the gas inlet to the gas outlet;
    a liquid inlet through which liquid to be concentrated is injected into the mixing corridor, the liquid inlet disposed in the mixing corridor between the gas inlet and the narrowed portion;
a demister disposed downstream of the concentrator section, the demister including a demister gas flow passage coupled to the gas outlet of the concentrator section, a liquid collector disposed in the demister gas flow passage to remove liquid from gas flowing in the demister gas flow passage, and a reservoir that collects the liquid removed from the gas flowing in the demister gas flow passage by the liquid collector;
a re-circulating circuit disposed between reservoir and the mixing corridor to transport liquid within the reservoir to the mixing corridor; and
a secondary re-circulating circuit including a settling tank to separate saturated liquid and suspended solids; and
a custom brine mixing device operatively coupled to the settling tank.

2. The liquid concentrator system of claim 1, wherein the custom brine mixing device includes a saturated liquid extraction port, a saturated liquid valve operatively coupled to the saturated liquid extraction port, a settled solids extraction port, a settled solids valve operatively coupled to the settled solids extraction port, and a controller operatively coupled to the saturated liquid valve and to the settled solids valve.

3. The liquid concentrator system of claim 2, wherein the custom brine mixing device includes a source of lubricant that is fluidly connected to a mixture line downstream of a point at which the saturated liquids and settled solids are mixed.

4. The liquid concentrator system of claim 3, wherein the controller is operatively coupled to a mixture weight sensor, to a saturated liquid weight sensor, and to a settled solids weight sensor.

5. The liquid concentrator system of claim 1, wherein the concentrator section includes an adjustable flow restriction disposed in the narrowed portion of the mixing corridor, the flow restriction adjustable to alter gas flow through the mixing corridor.

6. The liquid concentrator system of claim 5, wherein the adjustable flow restriction is a venturi plate that is adjustable to change the size or shape of the narrowed portion of the mixing corridor.

7. A method of making custom brines, the method comprising:
concentrating a liquid by evaporating a portion of water in the liquid to produce a partially concentrated liquid;
sending the partially concentrated liquid to a settling tank;
drawing suspended solids to the bottom of the settling tank to produce a settled solid portion in a first region of the settling tank while leaving dissolved solids in saturated liquid portion in a second region of the settling tank;

drawing a portion of the suspended solids from the first region;

drawing a portion of the saturated liquid from the second region; and mixing the suspended solids and the saturated liquid to form a custom brine mixture.

8. The method of claim 7, further comprising:

injecting a lubricant into the custom brine mixture.

9. The method of claim 7, further comprising measuring the weight of the custom brine mixture.

10. The method of claim 9, further comprising measuring the weight of the saturated liquid.

11. The method of claim 10, further comprising measuring the weight of the settled solids.

12. The method of claim 11, further comprising adjusting relative amounts of the saturated liquid and the settled solids to adjust the weight of the custom brine mixture.

13. The method of claim 7, wherein the liquid is concentrated in a concentrator including a gas inlet, a gas outlet, a mixing corridor disposed between the gas inlet and the gas outlet, the mixing corridor having a narrowed portion in which gas flow within the mixing corridor accelerates when traveling from the gas inlet to the gas outlet, a demister disposed downstream of the concentrator section, the demister including a demister gas flow passage coupled to the gas outlet of the concentrator section, and a liquid collector disposed in the demister gas flow passage to remove liquid from gas flowing in the demister gas flow passage.

* * * * *